UNITED STATES PATENT OFFICE.

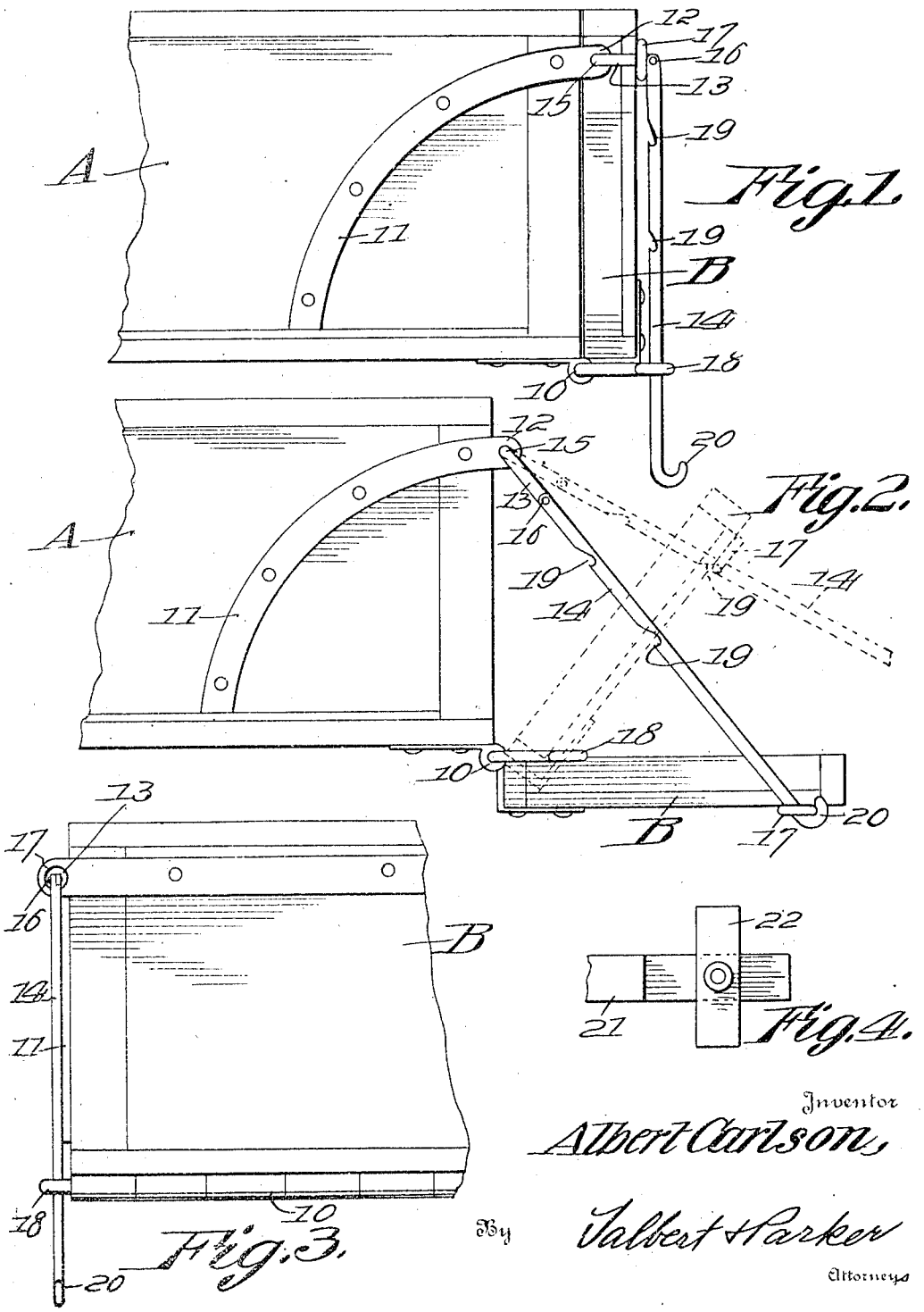

ALBERT CARLSON, OF CHICAGO, ILLINOIS.

TAIL-GATE LOCK.

1,270,695.  Specification of Letters Patent.  Patented June 25, 1918.

Application filed April 27, 1917. Serial No. 164,937.

*To all whom it may concern:*

Be it known that I, ALBERT CARLSON, a citizen of the United States, residing at Chicago, in the county of Cook and State of Illinois, have invented certain useful Improvements in Tail-Gate Locks, of which the following is a specification, reference being had therein to the accompanying drawing.

The invention relates to a wagon tail gate fastener, and more particularly to the class of adjustable tail gate hangers and locks for use on oil trucks, wagons or the like.

The primary object of the invention is the provision of a hanger and lock of this character wherein the tail gate of a wagon can be held fast in closed position and may be adjusted in any desired open position and securely held therein.

Another object of the invention is the provision of a hanger and lock of this character wherein the same is novel in form so as to secure the wagon gate closed and to permit the adjustment thereof with despatch.

A further object of the invention is the provision of a hanger and lock of this character which is extremely simple in construction, thoroughly reliable and efficient in its purpose, readily and easily adjusted, strong, durable and inexpensive in manufacture and installation.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claim.

In the drawing:

Figure 1 is a fragmentary side elevation of a wagon box and tail gate showing the hanger and lock constructed in accordance with the invention applied, the gate being locked closed;

Fig. 2 is a view similar to Fig. 1, showing by full lines the tail gate in full open position and by dotted lines in partly open position;

Fig. 3 is a fragmentary rear elevation;

Fig. 4 is a detail view of the combined hanger and lock, showing a slight modification.

Similar reference characters indicate corresponding parts throughout the several views of the drawing.

Referring to the drawing in detail, A designates a portion of a wagon box which is of the ordinary well known construction, and B the swinging tailgate which is supported by means of hinges 10 upon the wagon box and on each side wall of this wagon box A is mounted exteriorly thereof a curved bracket 11 which has the free end 12 thereof extended a slight distance beyond the open end of the wagon box, and to this bracket is connected the combined adjustable hanger and lock hereinafter fully described.

The combined adjustable hanger and lock comprises the inner and outer sections 13 and 14 of a hanger rod, the inner section being hinged at 15 or otherwise swingingly connected to the free end 12 of the bracket 11, and the section 14 is hinged at 16 or otherwise swingingly connected to the section 13, as shown. The hanger rod is freely slidable through an eye 17 secured exteriorly to the tail gate B, while the pintle of the hinge 10 supporting the tail gate B is formed with a locking hook 18 for the engagement therein of the section 14 of the hanger rod so that when the tailgate B is in closed position, as shown in Fig. 1 of the drawings and the hanger rod is turned at the joint 16 with the sections of said rod at right angles to each other and the section 14 engaged in the hook 18, the tail gate will be held fast in closed position.

Formed in one edge of the section 14 of the hanger rod at intervals thereof are retaining notches 19 for receiving the eye 17 on the tailgate B to hold the same in angularly open adjusted position, as shown in Fig. 2 of the drawing.

The end of the section 14 of the hanger rod is formed with a hook 20 for receiving the eye 17 when the gate B is in full open position so that the gate will be supported in such position by the hanger rod.

In Fig. 4 there is shown a slight modification of the invention, wherein the free end of the outer section of the hanger rod 21 has pivoted thereto a swinging cross button 22 which is in substitute for the hook 20, and constitutes a stop for engagement with the eye on the tail gate when in full open position for supporting the said tail gate by the hanger rod when in such position.

From the foregoing description, taken in connection with the accompanying drawing, the construction and operation of the herein described tail gate lock will be readily apparent and, therefore, a more extended explanation has been omitted.

Having thus described my invention, I claim:

The combination with a wagon body and tail gate therefor, of hinge members secured on the bottom of the body, a pintle carried by the hinge members and provided at its end with a locking hook, a bracket secured to the side wall of the body on the exterior thereof, a sectional hanger rod comprising two sections hingedly connected together, the two sections being of different lengths and the smaller section being pivotally connected with the bracket, and an eye on the tail gate near the upper edge thereof, the hanger rod passing slidably through the eye and having a hook at the free end of the longer section and being provided further with notches between the said hook and the point of connection between the two sections, whereby the tail gate may be extended to full open position, to intermediate positions between that and the closed position or locked in the closed position by having the hanger rod broken at the jointed connection between its two sections and having the longer section engage the said hook on the pintle.

In testimony whereof I affix my signature.

ALBERT CARLSON.

Copies of this patent may be obtained for five cents each, by addressing the "Commissioner of Patents, Washington, D. C."